Dec. 27, 1966   J. G. MACDONALD   3,293,943
HYDROSTATIC TRANSMISSION SYSTEMS AND CONTROLS THEREFOR
Filed Dec. 10, 1965   6 Sheets-Sheet 1
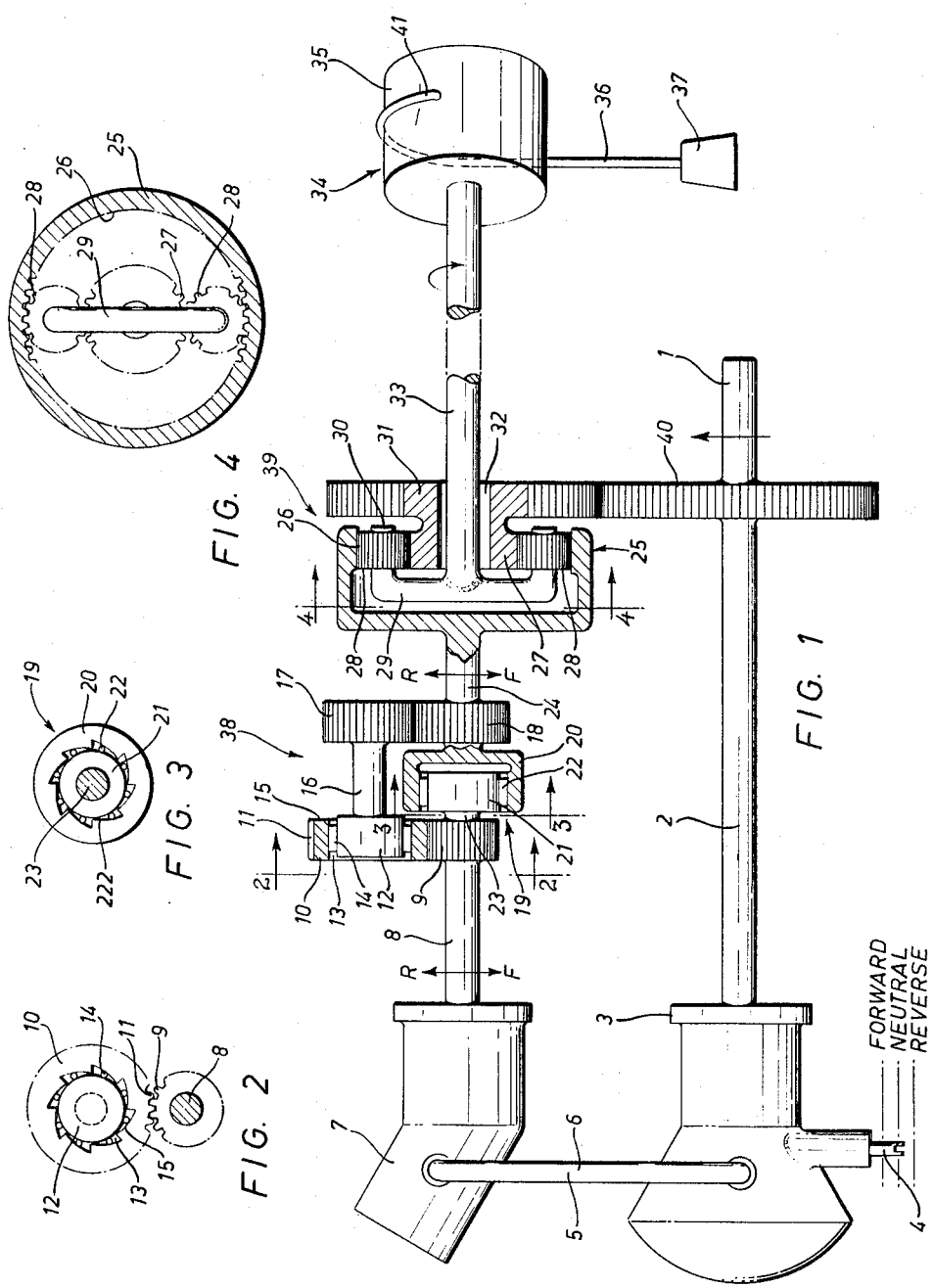
INVENTOR.
JOHN G. MACDONALD
BY
Douglas S. Johnson
Attorney Dec. 27, 1966  J. G. MACDONALD  3,293,943
HYDROSTATIC TRANSMISSION SYSTEMS AND CONTROLS THEREFOR
Filed Dec. 10, 1965  6 Sheets-Sheet 2

INVENTOR.
JOHN G. MACDONALD
BY
*Douglas S. Johnson*
Attorney

INVENTOR.
JOHN G. MACDONALD

BY

Attorney

Dec. 27, 1966     J. G. MACDONALD     3,293,943
HYDROSTATIC TRANSMISSION SYSTEMS AND CONTROLS THEREFOR
Filed Dec. 10, 1965                    6 Sheets-Sheet 5
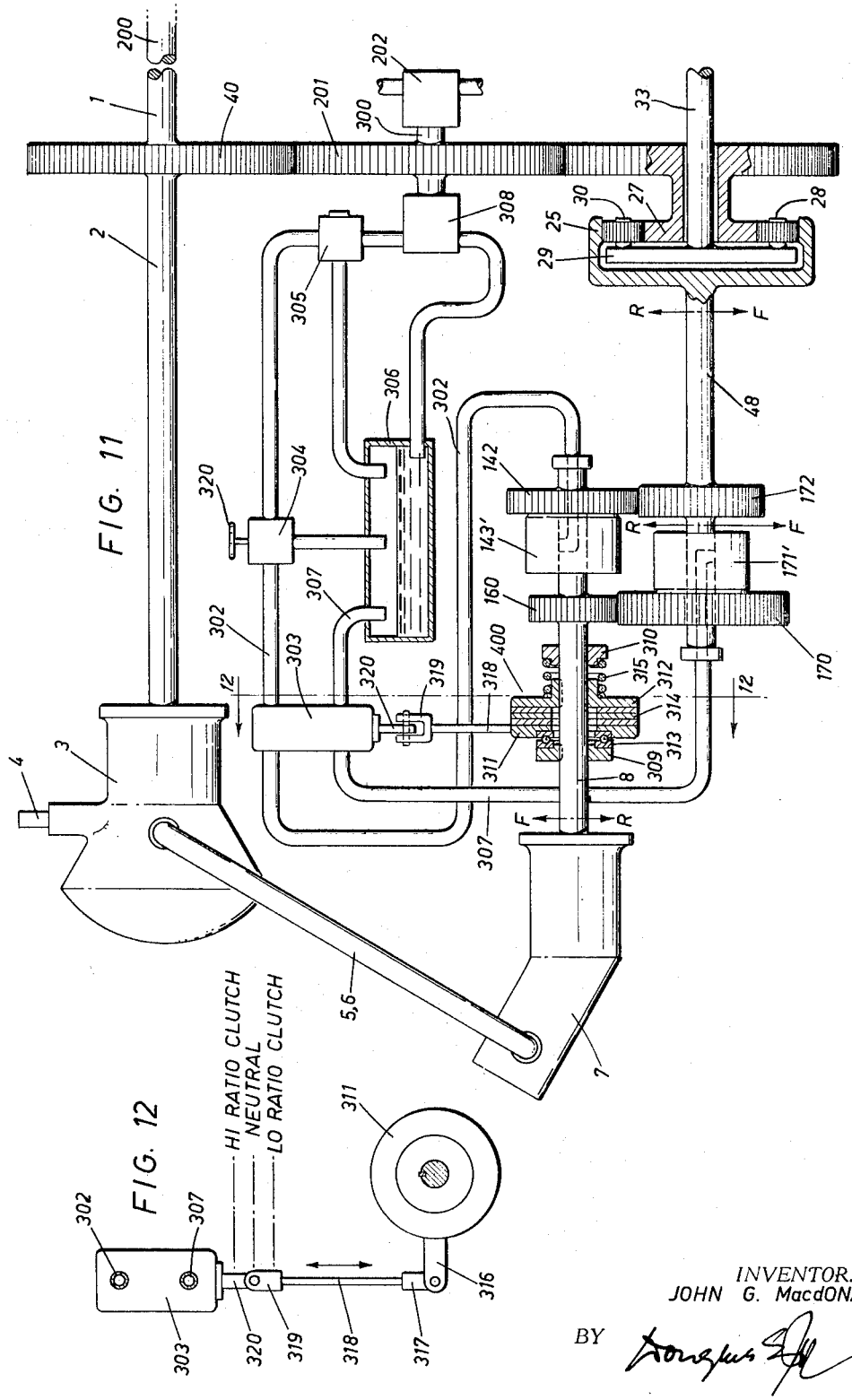
INVENTOR.
JOHN G. MacDONALD
BY
Attorney United States Patent Office 3,293,943
Patented Dec. 27, 1966

3,293,943
HYDROSTATIC TRANSMISSION SYSTEMS
AND CONTROLS THEREFOR
John Graham MacDonald, Goderich, Ontario, Canada
Filed Dec. 10, 1965, Ser. No. 517,174
72 Claims. (Cl. 74—687)

This present application is a continuation-in-part of application Serial No. 482,029, filed August 16, 1965, now abandoned, which application was a continuation-in-part of application Serial No. 372,887, filed June 5, 1964, now abandoned.

This invention relates to hydromechanical transmissions and more particularly, to such transmissions as comprise a variable speed hydrostatic pump and fluid motor drive combined with a constant speed mechanical drive.

Hydromechanical systems have the capacity of providing a wide and infinitely variable speed range for transmission systems, but it has been very difficult to take full advantage of these capacities.

With previous systems, particularly at low output speeds, the torque required has necessitated such pressures in the hydraulic system as has led to a reduction of the speed range. This shortcoming may be overcome to a limited extent by the use of a larger hydraulic motor but this measure has itself reduced the application of hydromechanical systems since the motors required are usually of such a large size that they are impractical particularly with respect to vehicle applications. Quite apart from the costs of the larger hydraulic motors, the construction costs of the vehicle itself are increased. In other applications, the size and costs also limit the enjoyment of the full capacities of hydromechanical systems.

In this present application, however, the inventor provides a system in which the capacities of such hydromechanical systems may be more fully realized.

The work accomplished by a hydraulic motor is a function of the pressure and flow of the fluid in the hydraulic system and as previously mentioned, the systems of the prior art have required higher pressures to produce higher torque with a resultant decrease in the maximum speed generated by the system. For a given hydrostatic transmission system there are consequently two main problems involved, an increase in the torque at lower speeds and an extension of the upper limits of the speed range.

While for some applications it may not be desirable nor even necessary to apply brake torque to the engine of transmissions, in others it may be and this should be accomplished with a minimum loss of efficiency and cost. In this present application embodiments of types of transmission are illustrated by way of example.

It is, therefore, an object of the present invention to provide in a given transmission system employing both a mechanical and a fluid drive means for combining the outputs of these drives to produce a higher torque at low speeds.

It is another object of the present invention to provide in a given transmission system employing both a mechanical and a fluid drive means for combining the outputs of these drives to produce wider range of speeds.

It is another object of the present invention to provide in a given transmission system employing both a mechanical and a fluid drive means for combining the outputs of these drives to produce a higher torque at lower speeds and to produce wider range of speeds.

Another object of this invention is to provide a transmission of the type described which is better adapted for driving road vehicles and heavy construction equipment powered by internal combustion engines and which requires a high output torque at low road speeds and a relatively lower torque at higher road speeds.

Another object of the present invention is to provide a transmission of the type described in which a braking torque may be applied to the engine with a minimum cost and loss of efficiency.

Another object of the invention is to provide a transmission which gives a wide continuous change in speed ratio from zero to full output speed without the need of manually shifted gears or complicated power actuated gear shifting mechanisms.

Another object of the invention is to provide a transmission comprised in part by a hydraulic pump and motor drive which may be of a smaller size than heretofore required to produce an equivalent range of speed and torque at the transmission output.

It is another object of the present invention to provide a transmission system employing both hydraulic mechanical drive means which enables a final drive to be reversed by a simple clutch system when the motors are operating.

It is yet another object of the present invention to provide an improved control system for a hydro-mechanical transmission system.

To accomplish these various objects in the present invention there is provided a transmission system comprising in combination a source of rotary power; a variable speed reversible hydraulic drive and control means therefor; a differential gear assembly including a first power input member, a second power input member, and a power output member, said first power input member being adapted for connection to said source of rotary power to be unidirectionally rotated thereby, said second power input member being adapted for connection to said source of rotary power by said hydraulic drive; and power transfer means for connecting said second power input member and said hydraulic drive, to vary the speed ratio between said hydraulic drive and said second power input member within a predetermined range according to the direction of rotation of said hydraulic drive; and means for actuating said power transfer means in accordance with the direction of rotation of said hydraulic drive.

Other objects and advantages of the invention will be apparent from the following specification and the accompanying claims and may be understood by reference to the accompanying drawings which by way of illustration, show preferred embodiments of the invention and in which;

FIG. 1 is a diagrammatic elevational view with sectioning made through the centre line of a transmission in accordance with the present invention;

FIG. 2 is a view looking in the direction of the arrows 2—2 in FIG. 1;

FIG. 3 is a view looking in the direction of the arrows 3—3 in FIG. 1;

FIG. 4 is a view looking in the direction of the arrows 4—4 in FIG. 1;

FIG. 11 is a diagrammatic elevation of a further embodiment of the present invention with several of the components being shown in section and including means for applying a braking torque to the engine; and FIG. 12 is a diagrammatic section taken along line 12—12 of FIG. 11 and serves to illustrate the operation of a brake torque applying mechanism;

Figure 5:
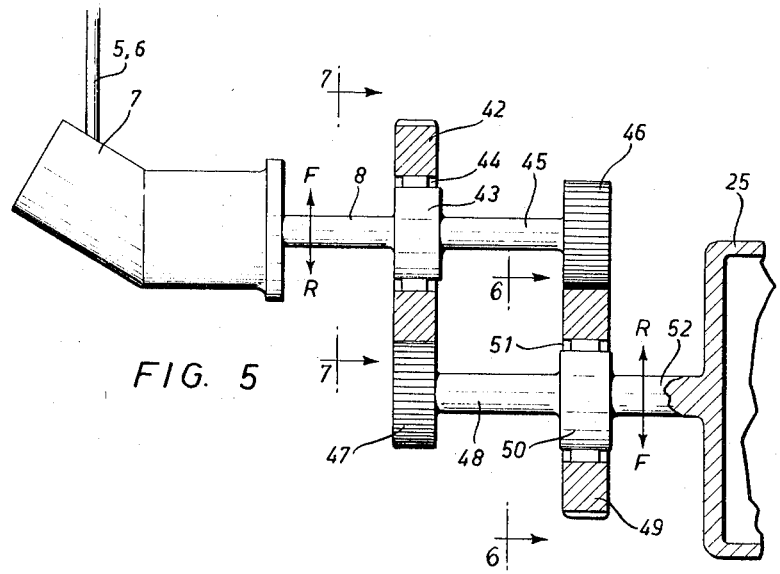
FIG. 5 is a diagrammatical elevational fragmentary view of an alternative transmission in accordance with the present invention with sectioning through the centre line thereof.

Referring now to the drawings, in FIG. 1 a partially sectioned transmission in accordance with the present invention is illustrated. As shown, this embodiment comprises an input shaft 1 which is adapted to be driven by a uni-directional source of power such as a diesel motor in the direction of the arrow. The input shaft 1 is rigidly connected to a pump drive shaft 2 which is in turn, connected to a piston-type hydraulic pump 3. Piston-type hydraulic pump 3 is controlled by a lever 4. Lever 4 is movable from a neutral position into forward position and into a reverse position and in these positions, controls the direction and rate of fluid flow in hydraulic system. Thus, the hydraulic system comprises pump 3 which is connected by means of hydraulic lines such as 5 and 6 (not shown) to a constant displacement fluid motor 7, which in turn, drives a shaft 8. In the neutral position, there will, of course, be no fluid flow and as the lever is gradually moved towards the forward position, the fluid flow in one direction increases to a maximum and as the lever 4 is moved towards the full reverse position, the fluid flow in a reverse direction, reaches a maximum.

Upon input shaft 1, a tooth gear 40 is fixed and rotates in unison with shafts 1 and 2. Gear 40 engages a gear 31 which forms part of a sun gear 27 which is mounted to turn freely about an output shaft 33 as shown at 32. The output shaft 33 supports at one end thereof an arm member 29 which in turn, supports planet gears 28 or spindles 30. These planet gears 28 engage the sun gear 27. External to the planet gears 28, a ring gear 25 is mounted and this also engages with the planet 28 as shown. This planetary system is generally indicated at 39. Ring gear 25 is in turn, connected to a shaft 24 which is coupled by means of a speed changer generally indicated at 38 to shaft 8 of the hydraulic motor 7.

For the purposes of the present disclosure, a winch 34 is mounted on the remote end of output shaft 33 from planetary 39. This winch comprises a drum 35 to which is secured at 41 a cable 36 with a weight 37.

It will also be understood that for the purposes of this description, gear 40 has 120 teeth, spur gear 31 has 120 teeth, sun gear 27 has 50 teeth, planet gears 28 each have 25 teeth and ring gear 25 has 100 teeth and that these gear specifications may be varied according to the application of the invention.

Speed changer 38 comprises a gear 18 mounted on shaft 24 and a gear 9 mounted upon shaft 8 inward of the outer end thereof; the adjacent ends of shaft 8 and 24 are connected by means of a free-wheeling clutch 19; a gear 17 is mounted on a shaft 16 at one end thereof to engage gear 18 and on the other end thereof, is mounted a gear 11 which engages with gear 9. Gear 11 is mounted on or in association with a free-wheeling clutch 10 also illustrated in section in FIG. 2. Clutch 10 is constituted by a portion 12 of shaft 16 which projects into central hole in gear 11, and the surface of this hole is provided with a series of wedge shaped lips 15. Within the chambers defined by these lips and shaft 12 a series of free rollers such as 14 are provided. Thus, if shaft 16 is turned in a direction opposed to the direction of shaft 24 and since shaft 8 will resist such a motion, the rollers 14 will lock lips 15 to turn gear 11. Clutch 19 comprises a sleeve 20, the inner surface of which is provided with wedge shaped lips 222 as in clutch 10. Sleeve 20 surrounds a shaft projection 21 of shaft 8 and between shaft projection 21 and lips 222 free rollers 22 are provided. The action of clutch 19 is the same as clutch 10 except that it will lock up when shaft 8 is rotated in the direction indicated by the arrow F.

In this present embodiment, gear 11 has 52 teeth, gear 9 has 26 teeth, gear 18 has 39 teeth and gear 17 has 39 teeth.

It will, of course, be understood that the provision in FIG. 1 of a winch 34 is merely for the purpose of illustrating the direction of the load imposed on the output shaft, and to those skilled in the art and the other applications of this present transmission will be apparent.

Let it be assumed that speed changer 38 is deleted, shaft 8 and 24 comprise a single shaft so that shaft 8 will drive the ring gear 25 or assume shaft 8 is rigidly connected to shaft 24 to drive ring gear 25; that input shaft 1 is driven at a constant speed of 2000 r.p.m. in the direction of the arrow; and that the control lever 4 of the hydraulic pump 3 is set to a position halfway between full reverse and neutral so that the shaft 8 is caused to rotate at 1000 r.p.m. in the direction indicated by the arrow R. Under these conditions, ring gear 25 will be caused to turn at 1000 r.p.m. in a direction opposite to the direction of rotation of sun gear 27 which, since the gearing on gears 31 and 40 are equal, will be revolving at 2000 r.p.m. By virtue of the gear ratios between the ring gear 25, the planet gears 28 and the sun gear 27, the planet gear 28 will rotate on spindles 30 of the arm 29 and the output shaft 33 will remain stationary. By providing slightly fewer teeth on gear 40, the sun gear 27 may be driven at a constant speed of slightly less than 2000 r.p.m. so that when the ring gear 25 is turning at 1000 r.p.m. in a direction opposite to the direction of the sun gear 27, the output shaft 33 will turn very slowly in the "R" direction instead of remaining stationary.

Let it be now assumed that the control 4 is moved towards the neutral position. Ring gear 25 will slow down and the output shaft 33 will rotate the winch drum 35 to raise weight 37. Thus, the load on the output shaft 33 will be so imposed as to try and turn shaft 8 in the R direction and under these circumstances, the torque on the shaft 8 causes the fluid motor 7 to act as a pump and drive the pump 3 as a motor and power will be returned to shaft 2. Thus the torque on shaft 8 and 24 when directly connected, will be equal.

Let the control 4 now be placed in the neutral position, the fluid motor 7 is stopped and the ring gear 25 will be stationary, the input shaft 1 is still turning at 2000 r.p.m. in the direction of the arrow and by virtue of the relationship between the sun gear 27 and the planet gear 28, the output shaft 33 will be driven at a speed of 666 r.p.m. in the direction of the arrow to lift weight 37. This is the base speed.

Let the control 4 now be moved towards the forward position. Ring gear 25 will now be driven by fluid motor 7 in the same direction as the sun gear 27 so that when control 4 is in the full forward position, ring gear 25 and the sun gear 27 will be turning at 2000 r.p.m. in the same direction so that the output shaft 33 will turn at 2000 r.p.m. in the direction of the arrow.

The above description, that is, the description with speed changer 38 omitted, and shafts 8 and 24 a single entity may be regarded as typical of a conventional application of hydrostatic transmissions, and it will be noted that the fluid motor shaft 8 must be rotated at 1000 r.p.m. in the R direction to produce no motion on the output shaft 33.

It has also been shown that the torque imposed on shaft 8 of the fluid motor 7 is equal to the torque on the shaft 24 connected to the ring gear 25. However, a fluid motor 7 and the fluid motor shaft 8 is capable of turning approximately 2000 r.p.m. in either direction of rotation when employed with the input shaft 1 operated at 2000 r.p.m.

If the maximum speed of the input shaft 1 can be maintained at 2000 r.p.m. while the fluid motor shaft 8 is operated at a speed of 2000 r.p.m. in a reverse direction, to provide no motion on output shaft 33, the torque capabilities of the fluid motor 7 will be increased as compared to the torque capabilities with the fluid motor shaft 8 revolving at 1000 r.p.m. in the reverse direction to produce no motion, without any sacrifice of the infinitely variable speed range of the transmission.

Let it now be assumed that the speed changer 38 as described is incorporated in the system between shafts 8 and 24 and with the fluid motor 3 stopped, as in the previous example, the base speed of the output shaft will still be 666 r.p.m. and if sun gear 27 is revolved at 2000 r.p.m. while ring gear 25 is revolving at 1000 r.p.m. in the opposite direction, the output shaft 33 will then be stationary, and control 4 will be in a reverse position. As control 4 is moved towards the neutral position, ring gear 25 will be slowed down while turning in an opposite direction to sun gear 27 and output shaft 33 will be caused to revolve a speed less than the base speed of 666 r.p.m. Under these conditions, shaft 24 will be driven in the R direction by virtue of the previously illustrated direction of the load on the output shaft 33. Gear 18 will cause gear 17 and shaft 16 to turn in a direction opposed to the direction of shaft 24. As shaft projection 12 of shaft 16 is being turned in a direction opposite to the direction of shaft 24 and since shaft 8 will react against being turned faster than its set speed, rollers 14 will lock against the wedge lips 15, causing gear 11 to be turned. Gear 11 having a ratio of 2:1 to gear 9, will cause shaft 8 to be driven at twice the speed of shaft 24, and when ring gear 25 is driven at 1000 r.p.m., the fluid motor shaft 8 will be driven in reverse at 2000 r.p.m. The free wheeling clutch 19 will, of course, not be engaged and the only operable connection between shaft 8 and 24 will be through the gear system comprising gears 9, 11, 17 and 18.

Thus, if the gear 40 is such that sun gear 27 rotates at slightly less than 2000 r.p.m. while the ring gear 25 is rotating in an opposed direction at 1000 r.p.m., the free wheeling clutch 10 will be disengaged as will be the free wheeling clutch 19 and the output shaft 33 will be free.

It will be seen that from the above, at low output speeds, the torque on the fluid motor shaft is reduced and the pressure in the hydraulic system will be reduced as compared to the pressure required in a conventional transmission, but the speed of rotation of the hydraulic motor shaft is considerably increased and so the torque capabilities are increased.

When control lever 4 is moved into the forward position, the pump 3 will resume its characteristics as a pump and fluid motor 7 will drive shaft 8 in the forward or F direction the free wheeling clutch 19 will lock up rollers 22 being held in engagement between the adjacent lips of sleeve 20 and shaft 23, and shaft 8 and 24 will rotate as one. Shaft 6 will be caused to rotate in an opposite direction to shafts 8 and 24 and since the shaft projection 12 revolves at a higher speed than gear 11, free wheeling clutch 10 will not be locked up. Thus, the speed range of the transmission illustrated in FIG. 1 will be the same as those of a conventional transmission.

Figure 6:
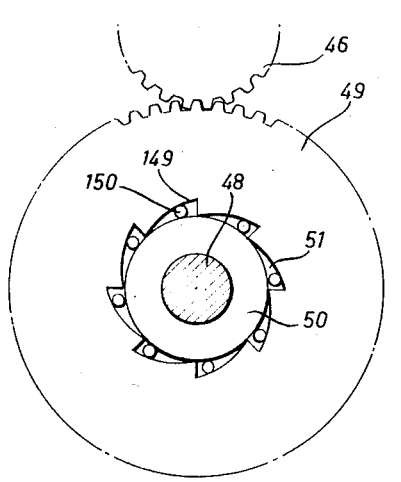
FIG. 6 is a view looking in the direction of line 6—6 of FIG. 5.
Figure 7:
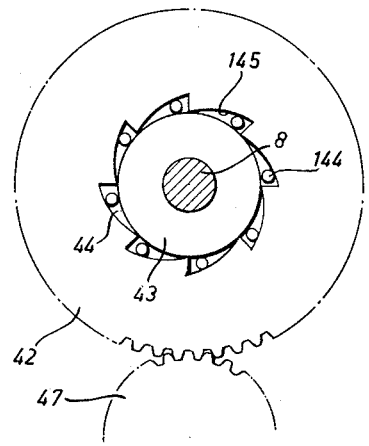
FIG. 7 is a view looking in the direction of line 7—7 in FIG. 5.

FIGS. 5, 6 and 7 illustrate an alternative embodiment of the speed changer illustrated in FIGS. 1 through 3, but in which a wider speed is available.

As in FIG. 1, in FIG. 5 numeral 7 indicates a constant displacement hydraulic motor and this will be understood to be driven in the same manner as the hydraulic motor 7 of the embodiment illustrated in FIG. 1, that is, by means of a pump such as 3, and the ring gear 25 will also be understood to engage with a planetary gear such as 28 which will, in turn, engage a sun gear 27 driven in the same manner as the sun gear 27 of the embodiment of FIGS. 1 through 3. However, it will be noticed that the shaft 8 of motor 7 and shaft 48 having a portion 52 which corresponds to shaft 24, are two separate shafts. Upon shaft 8, a first clutch 44 is mounted which comprises a central member 43 of shaft 45 and upon 43, a tooth gear 42 is mounted. The inner surface of tooth gear 42 is provided with wedge shaped lips 145 within which are disposed rollers such as 144 and on the remote end of shaft 45 from the hydraulic pump 7, a gear 46 is fixed. On shaft 48, at the end thereof remote from ring gear 25, a gear 47 is mounted which engages with gear 42 of shaft 48 and intermediate the length of shaft 48, a second gear 49 is mounted upon a free-wheeling clutch 51. Clutch 51 is constituted by a collar 50 or shaft 48 and gear 49 which has wedge-shaped lips 149 on the inner surface thereof, and between these wedge-shaped lips 149 and collar 50 are free rollers such as 150.

In this embodiment, gear 46 has 26 teeth and gear 42 has 40 teeth. Gear 47 has 38 teeth and gear 49 has 52 teeth. Gear 49 engages gear 46 and gear 47 engages gear 42.

In the embodiment illustrated in FIGS. 1 through 3, shaft 24 when rotated in the forward direction, rotated at the same speed as shaft 8, however, this relationship limited the range of which the transmission was capable. In this present embodiment, it will be shown that shaft 48 can be revolved at a greater speed than shaft 8 both in the forward and reverse directions and consequently, the ring gear 25 may be driven faster than shaft 8 when the fluid motor 7 is actuated in the forward and reverse directions. This feature again reduces the torque imposed on the fluid motor shaft while permitting the transmission speed range to be increased without unduly raising the pressure in the hydraulic system.

Since this embodiment employs shafts 8 and 48 disposed in the relationship previously described, the relative motion between shaft 8 and ring gear 25 will be reversed with respect to the embodiments as described in FIGS. 1 through 3, but this reversal may be accommodated for by reversing the position of the control valve 4 on pump 3 of FIG. 1.

When ring gear 25 is actuated in the R direction as indicated by the arrow, clutch 51 will be locked up and gear 49 will drive gear 46 which will, in turn, drive shaft 8. However, since the ratio between gears 49 and 46 is 2:1 shaft 8 will be revolved at twice the speed of shaft 48 and gear 25. The clutch 44 will be free and the fluid motor 7 will be driven at a higher speed than the ring gear 25 when ring gear 25 is moving in a direction opposite to the direction of the sun gear 27, that is, at speeds below the base speed of the differential 39.

When the control 4 of the hydraulic pump 3 is in the F or forward position, clutch 44 will be locked up causing gear 42 to turn gear 47 so that shaft 48, by virtue of the gear ratio between these two gears, will be revolved faster than shaft 8 and in an opposite direction, and ring gear 25 will be driven faster than the shaft 8 of the fluid motor. Clutch 51 will, of course, be free in this position.

Thus, the speed of the ring gear 25 will be greater than the speed of the output shaft 8 of the fluid motor 7 than it would be if the fluid motor shaft 8 were directly connected to the planetary gear 25. Thus, at the higher speeds, the torque is decreased as compared to a system wherein the fluid motor output shaft speed is equivalent to the speed of the ring gear speed.

Figure 8:
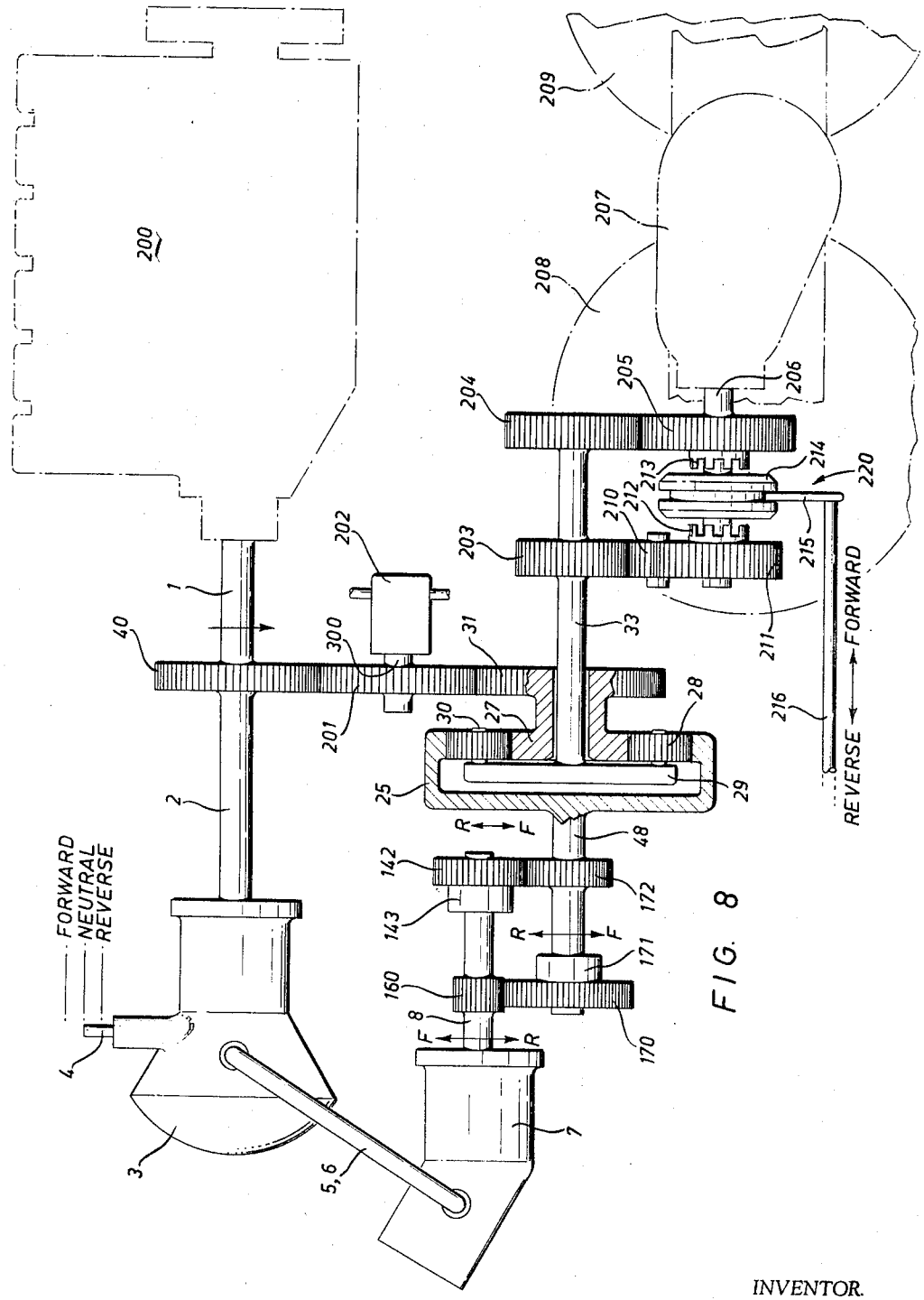
FIG. 8 is a diagrammatic elevational view of a transmission in accordance with the present invention, applied to a vehicle, and with sectioning through the centre line thereof.

FIG. 8 is a further alternative embodiment of the present invention and illustrates the application of the present type of transmission to a road vehicle.

As is well known, road vehicles require a greater torque output at the lower speeds than at higher speeds and the present system is ideally suited for such an application.

There is the further advantage in this present system in that it provides a means whereby a single control may be employed and the direction of the vehicle may be reversed very easily and conveniently without stopping either the fluid motor 7 or the internal combustion engine indicated in dotted outline 200.

The several components of the transmission system of FIGURE 8 are similarly numbered to the transmission system of FIGURE 5. As mentioned previously a prime mover such as a diesel motor is indicated in dotted outline at 200 with the output shaft thereof being indicated by 1. Again, a gear 40 is mounted upon an output shaft 1 and output shaft 1 is connected to a fluid motor pump 3 by means of a shaft 2. 4 indicates the pump control. 7 indicates the fluid motor and 5 and 6 (not shown) indicate the hydraulic lines. Shaft 8 is again the hydraulic motor shaft upon which are mounted a first gear 160 and a second gear 142. Gear 142 is supported by a free wheeling clutch 143 of the same type as clutch 44 of FIGURE 7. Gear 160 engages gear 170 mounted on shaft 48 and gear 170 is also mounted upon a clutch 171 of the same type as clutch 51 shown in FIGURE 6, and gear 142 engages gear 172 mounted on shaft 48. On shaft 48 a ring gear 25 is again mounted and ring gear 25 engages planetary gears 28 which are mounted upon spindles 30 which in turn are supported by arm 29. Arm 29 is mounted on an output shaft 33 about which the sun gear 27 is free to rotate. Affixed to sun gear 27 is a spur gear 31 which engages gear 201 which in turn, meshes with gear 40 on shaft 1. The position of gear 201 between gears 40 and gear 31 in this embodiment serves to reverse the direction of rotation of sun gear 27, thereby to accommodate the reverse motion of shaft 8 with respect to the ring gear. Gear 201 also serves to actuate an hydraulic charging pump indicated at 202 through shaft 300. On output shaft 33, a pair of gears 203 and 204 are mounted as shown. Gear 204 engages a gear 205 mounted upon shaft 206 and shaft 206 is connected in the usual manner to a final drive such as 207 indicated in dotted outline and 207 in turn actuates wheels such as 208 and 209. Gear 203 engages a reversing gear 210 which in turn engages gear 211 on shaft 206. Gears 211 and 205 are provided with dogs 212 and 213 respectively. These dogs, together with the clutch body 214, constitute a dog clutch 220 which is actuated by means of the levers 215 and 216 in the directions indicated by the arrows.

In this embodiment, gear 160 has 28 teeth, gear 170 has 56 teeth, gear 142 has 40 teeth and gear 172 has 44 teeth. Gear 40 is provided with 57 teeth and gears 201 and 31 with 58 teeth respectively. Gears 204 and 205 are provided with 32 and 47 teeth respectively and gears 203 and 211, with 27 and 40 teeth respectively.

The method of operation of the embodiment illustrated in FIGURE 8 is substantially the same as that of the embodiment illustrated in FIGURES 5, 6 and 7. Thus, when ring gear 25 is turning in the R direction, opposite to the direction of rotation of sun gear 27, the free wheeling clutch 171 will lock up causing gear 170 to drive gear 160 at twice the speed of gear 170. Clutch 143 will free wheel so that the fluid motor shaft 8 will be driven at twice the speed of the ring gear 25.

With the gear ratios specified with respect to the gears of this embodiment, when the fluid motor 7 drives shaft 8 in the forward direction clutch 143 will be locked up causing gear 142 to drive gear 172 so that shaft 48 will be turned slower than shaft 8. Clutch 171 will, of course, be free and the ring gear 25 will be driven slower than shaft 8 of the fluid motor 7 and again, the speed of the ring gear being slower than the speed of the output shaft 8, the transmission will be provided with a wider speed range.

It will be noted that by virtue of the ratio of gears 40, 201, 31 and 27 when ring gear 25 is turning at 1000 r.p.m. in the reverse direction to the sun gear 27 the sun gear will have a speed of just under 2000 r.p.m. and the two clutches 171 and 143 will be disengaged and thus output shaft 33 will be free. Dog clutch 220 may thus be engaged while motors 7 and 200 are actuated and the vehicle may be reversed with facility or any auxiliary assistance.

Figure 9:
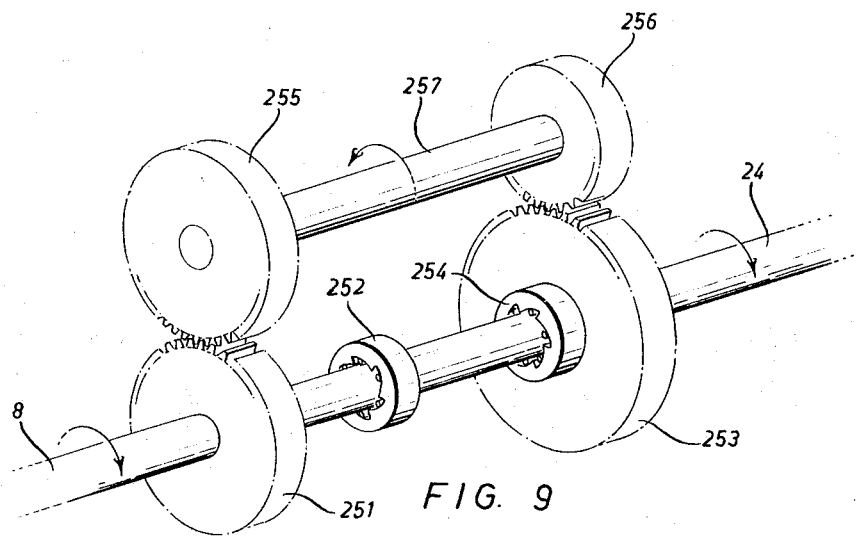
FIG. 9 is a diagrammatic perspective view of an alternative embodiment of a speed changing mechanism in accordance with the present invention and serves to illustrate the operation thereof.
Figure 10:
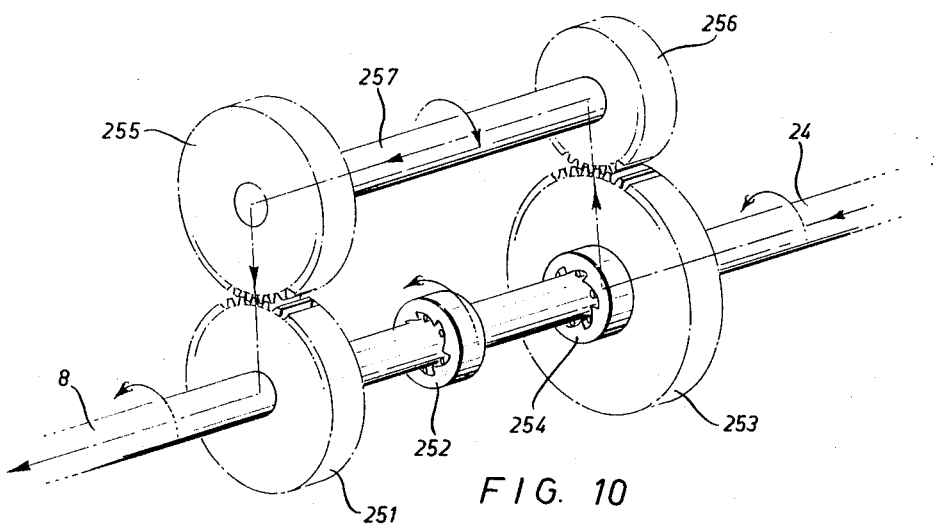
FIG. 10 is a second view of the speed changing arrangement of FIG. 9 operating in an opposed direction.

In FIGS. 9 and 10 are enlarged perspective views of an alternative embodiment of the speed changing mechanism 38.

In both FIGS. 9 and 10 the corresponding components are similarly numbered. Shaft 8 is connected to drive or be driven by an hydraulic motor such as 7 and the shaft 24 is connected to a ring gear such as 25. Upon shaft 8 intermediate its ends a gear 251 is fixed and shaft 8 is connected at its free end by means of a free wheeling clutch 252, of the same form as clutch 19 to shaft 24.

Shaft 24 is also provided with a gear 253 mounted on a second free wheeling clutch 254 which is engaged with shaft 24 in an opposed direction to that in which clutch 252 engages. Gears 251 and 253 engage gears 255 and 256 on a second shaft 257. Gears 251 and 253 have 39 and 52 teeth respectively and gears 255 and 256 have 39 and 26 teeth respectively.

Thus, when shaft 8 is driven in the direction of the arrow in FIGURE 9 clutch 252 is locked up and shaft 24 is driven in the same direction at the same speed. Clutch 254 will remain free during this motion.

When the direction of motion of shaft 8 is reversed to the direction shown in FIGURE 10 by the driving of shaft 24 clutch 254 will lock up and drive shaft 257 through gears 253 and 256, and gear 255 will in turn drive gear 251 and shaft 8 in the direction indicated by the arrow in FIGURE 10.

However, in the arrangement operating in FIGURE 9 shafts 8 and 24 will have the same speed and direction but in the arrangement operating in FIGURE 10 shaft 8, while being driven in the same direction as shaft 24, will rotate at twice the speed. This embodiment of speed changer 38 may thus be substituted for those embodiments already illustrated to provide a higher output torque at lower output speeds.

For convenience the several components illustrated in FIGURE 11 are numbered similarly to the components to which they correspond in the other illustrated embodiments so that their cooperation and interaction may be clearly understood but it will be evident that the clutch system employed may, with equal facility, be accommodated by any of the embodiments and modifications previously described.

A prime mover output shaft 1, is driven by a prime mover not shown in this figure but again a diesel motor such as 200 may be employed. A gear 40 is mounted on shaft 1 and by means of shaft 2 output shaft 1 is connected to a fluid motor pump 3. 4 agains indicates the pump control. A fluid motor is indicated at 7, and 5 and 6 (not shown) the hydraulic lines connecting motor 7 and pump 3. A hydraulic motor shaft 8 has mounted thereon a first gear 160 and a second gear 142. Gear 142, however, is in this embodiment connected by means of a hydraulically actuated clutch 143' to shaft 8 and there is also mounted on shaft 8 a slip-type clutch 400. Gear 160 engages gear 170 which in turn connects through a second hydraulically actuated clutch 171' to a shaft 48 and gear 142 engages gear 172 mounted on shaft 48. Again, as in FIG. 8 a ring gear 25 is mounted on shaft 48 and this gear engages planetary gears 28 mounted on spindles 30 which are in turn supported by arm 29. Arm 29 is mounted on an output shaft 33 about which sun gear 27 is free to rotate. A spur gear 31 is affixed to sun gear 27 and engages gear 201 which in turn meshes with gear 40 on shaft 1. The positioning of gear 201, as in the embodiment illustrated in FIG. 8, serves to reverse the direction of sun gear 27 thereby accommodating the reverse motion of shaft 8 with respect to ring gear 25.

As has been previously mentioned clutches 143′ and 171′ are hydraulically actuated and are so arranged that they will be locked up or released according to the direction of rotation of shaft 8 in a manner which will be described later. These clutches may be of any commercially available type. One such type is sold under the trade name "Rockford."

Clutch 143′ is connected by means of a hydraulic line 302, through a spool type valve 303, a by-pass valve 304, and a relief valve 305 to a hydraulic reservoir 306. Clutch 171′ is connected through a hydraulic line 307 and valve 303 to reservoir 306 in the manner illustrated. This system may be charged by a pump 308 mounted on shaft 300.

Clutch 400 on shaft 8 provides the means for controlling the actuation of clutches 143′ and 171′. The clutch actuated will depend on the direction of rotation of shaft 8. As shown, it comprises a pair of spaced apart collars 309 and 310 fixed to shaft 8, intermediate these collars is a series of friction discs 314 mounted between plates 311 and 312. Plate 311 is supported on a thrust bearing 313 and plate 312 is keyed to shaft 8. Between plate 312 and collar 310 a compression spring 315 is mounted. Plate 311 is provided with a radial arm 316 which is hingedly secured through a clevis 317, rod 318, and a second clevis 319 to the actuating arm 320 of valve 303.

As with the embodiment illustrated in FIG. 8 and assuming that the correspondingly numbered gears are equivalent when fluid motor 7 drives shaft 8 in the forward direction, plate 311 of clutch 300 will tend to be rotated therewith urging rod 318 upwards so that the high-ratio clutch 143′ will be locked up causing gear 142 to drive gear 172 so that shaft 48 will be turned slower than shaft 8. Clutch 171′ will of course be free and ring gear 25 will be driven slower than shaft 8.

When the direction of rotation of shaft 8 is reversed, that is when ring gear 25 is turning in the R direction, plate 311 of clutch 300 will again tend to be rotated therewith causing rod 318 to be pulled downward. This action in turn actuates valves 303 so that fluid actuating clutch 143′ will be drained off and clutch 171′ actuated and shaft 8 will be driven at twice the speed of shaft 48.

As mentioned previously a by-pass valve 304 is provided and this is actuated by a pedal or similar control 321. When actuated, both clutch circuits will be drained and ring gear 25 will be free-wheeling. However, apart from such a period ring gear 25 of this present embodiment will not be free-wheeling and a solid drive will be effected with consequent effect of engine braking.

If the operator desires the by-pass valve may be actuated to permit coasting and facilitate quick stops and changes in direction.

It will be of course, understood that output shaft 33 may be connected to the final drive as in FIG. 8 or in any suitable manner.

Figure 13:
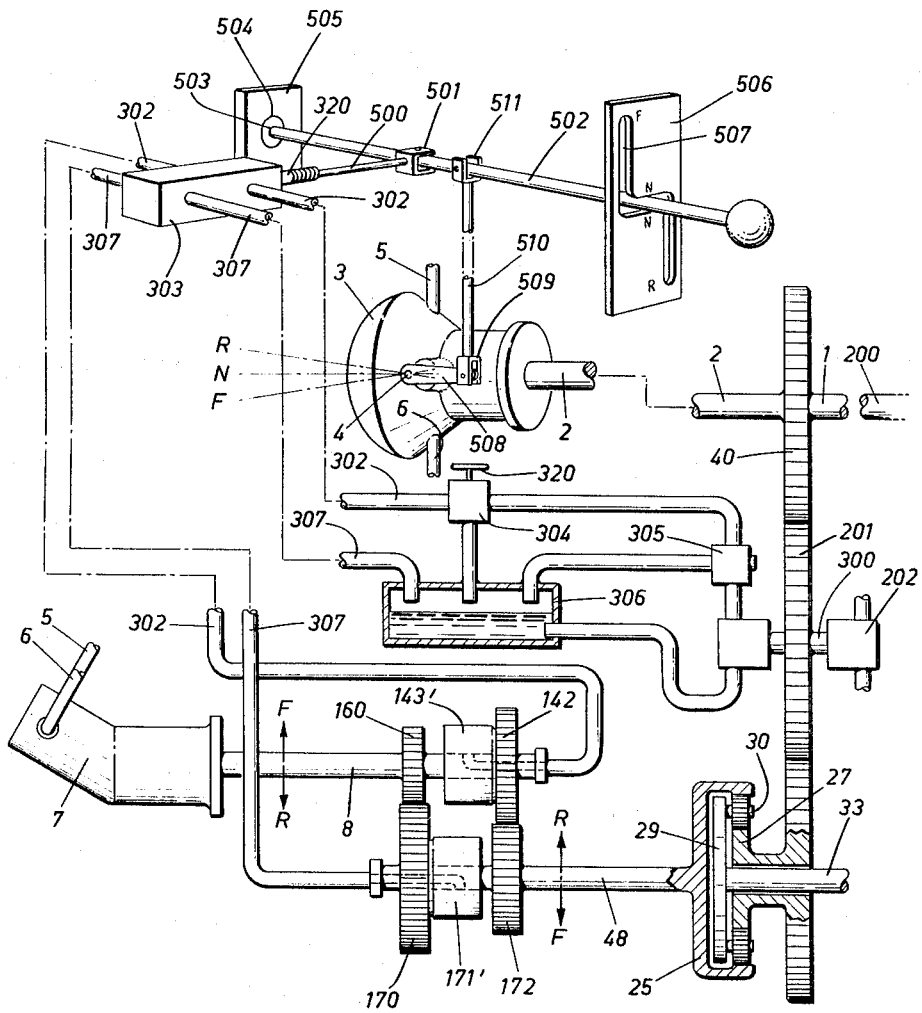
FIG. 13 is a diagrammatic elevation of an alternative embodiment of a transmission system in accordance with the present invention and illustrates one example of a transmission system which may be controlled by a single lever.

In FIG. 13 there is illustrated a diagrammatic view of an alternative embodiment of a transmission system in accordance with the present invention which obviates the necessity for the slip-type clutch 400 on shaft 8, and which provides a single simultaneous control for the pump and clutches.

In FIG. 13 the components are similarly numbered to the corresponding components of FIG. 11. However, it is to be noted that valve 303 is in this embodiment connected by means of line 307 to clutch 171′ and line 302 connects valve 303 to clutch 143′ as in the embodiment illustrated in FIG. 11. Line 307 on the other side of valve 303 again connects with the reservoir 306 and line 302 to a relief valve 305. The actuating arm of 320 of valve 303 is connected by means of a rod and clevis 500 and 501, respectively, to a control rod 502. Control rod 502 is pivotally mounted at one end 503 by any suitable means such as a universal ball joint 504 which engages a mounting plate 505. The other end of rod 502 passes through a gate 506 having a Z-shaped slot 507 as illustrated. Gate 506 controls the direction of movement of rod 502.

Intermediate clevis 501 and gate 506 pump control 4 is connected by means of a lever 508, a clevis 509, an adjustable rod 510 and a clevis 511 to rod 502 as shown. As with the previously described embodiments when lever 4 is in its uppermost position control rod 502 is at the maximum height of its travel in slot 507, that is, adjacent the marking F on gate 506. In this attitude the control rod 502 and the control lever 4 of pump 3 will be in the maximum forward position. The motion of rod 502 will have been transmitted through rod 500 to the actuating arm 320 of valve 303 and valve 303 will permit the hydraulic fluid to flow along line 302 to clutch 171′ locking up clutch 171′ and enabling the ring gear 25 to be driven by fluid motor 7 in the same direction as sun gear 27.

As control rod 502 is moved down through slot 507 to the neutral (n) position the motion is translated by rod 510 and rod 500 so that control lever 4 is moved into the neutral position and the fluid motor 7 will be stopped so that the ring gear 25 will be stationary. However, both clutches 143′ and 171′ will both be engaged when rod 500 is in the horizontal portion of slot 507. With the further movement of rod 502 horizontally and down through the slot 507 of gate 506 the valve 303 will engage clutch 143′ and at the end of its travel along this horizontal portion clutch 171′ will be released by drawing hydraulic fluid therefrom and the direction of rotation of shaft 8 will be simultaneously reversed so that shaft 8 will be driven at twice the speed of shaft 48. This latter embodiment as with the embodiment as illustrated in FIGURE 7 and FIGURE 11 also provides a braking torque for the engine while at the same time providing a single control for actuating both the pump and the clutches.

While the several embodiments of the present invention have been described with some particularity, it will be understood that the various other such modifications in the control for the clutches and variations in the gear ratios and relative speeds may be made without departing from the spirit and scope of the appended claims.

I claim:

1. A transmission system comprising in combination a source of rotary power; a variable speed reversible hydraulic drive and control means therefor; a differential gear assembly including a first power input member, a second power input member, and a power output member, said first power input member being adapted for connection to said source of rotary power to be uni-directionally rotated thereby, said second power input member being adapted for connection to said source of rotary power by said hydraulic drive; and power transfer means adapted to connect said second power input member and said hydraulic drive, said power transfer means being responsive to the direction of rotation of said hydraulic drive to vary the speed ratio between said hydraulic drive and said second power input member within a predetermined range.

2. A transmission system comprising in combination a source of rotary power; a variable speed reversible hydraulic drive and control means therefor; a differential gear assembly including a first power input member, a second power input member, and a power output member, said first power input member being adapted for connection to said source of rotary power to be unidirectionally rotated thereby, said second power input member being adapted for connection to said source of rotary power by said hydraulic drive; and power transfer means adapted to connect said second power input member and said hydraulic drive whereby in a first direction of rotation of said hydraulic drive the speed ratio between said second power input member and said hydraulic drive is of a first predetermined value, and in a second direction of rotation of said hydraulic drive the speed ratio between said second power input member and said hydraulic drive assumes a second predetermined value.

3. A transmission system as claimed in claim 1 including means for actuating said power transfer means in accordance with the direction of rotation of said hydraulic drive.

4. A transmission system as claimed in claim 2 including means for actuating said power transfer means in accordance with the direction of rotation of said hydraulic drive.

5. A transmission system as claimed in claim 1 wherein said power transfer means comprise in combination:
a first rotatable shaft connected to said hydraulic drive;
a second rotatable shaft connected to said second power input member;
said first shaft being adapted to drive in a first direction and be driven in a second direction;
said second shaft being adapted to be driven in a first direction by said first shaft when said first shaft is rotating in said first direction and to drive said first shaft in said second direction when said second shaft is driving in a second direction, and coupling means for connecting said shafts whereby the speed of rotation of said first shaft in a second direction exceeds the speed of rotation of said second shaft in a second direction.

6. A transmission system as claimed in claim 2 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft being adapted to be driven in a first direction by said first shaft when said first shaft is rotating in said first direction and to drive said first shaft in said second direction when said second shaft is driving in a second direction, and coupling means for connecting said shafts whereby the speed of rotation of said first shaft in a second direction exceeds the speed of rotation of said second shaft in a second direction.

7. A transmission system as claimed in claim 3 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft being adapted to be driven in a first direction by said first shaft when said first shaft is rotating in said first direction and to drive said first shaft in said second direction when said second shaft is driving in a second direction; and coupling means for connecting said shafts, whereby the speed of rotation of said first shaft in a second direction exceeds the speed of rotation of said second shaft in a second direction.

8. A transmission system as claimed in claim 4 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft being adapted to be driven in a first direction by said first shaft when said first shaft is driving in a second direction, and coupling means for connecting said shafts whereby the speed of rotation of said first shaft in a second direction exceeds the speed of rotation of said second shaft in a second direction.

9. A transmission system as claimed in claim 1 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft adapted to be driven in a first direction by said first shaft when said first shaft is rotating in said first direction and to drive said first shaft in said second direction when said second shaft is driving in a second direction; and coupling means for connecting said shafts whereby the speed of rotation of said first shaft in a second direction exceeds the speed of rotation of said second shaft in a second direction, and the speed of said second shaft in a first direction is substantially equal to the speed of rotation of said first shaft in said first direction of rotation.

10. A transmission system as claimed in claim 2 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft adapted to be driven in a first direction by said first shaft when said first shaft is rotating in said first direction and to drive said first shaft in said second direction when said second shaft is driving in a second direction; and coupling means for connecting said shafts whereby the speed of rotation of said first shaft in a second direction exceeds the speed of rotation of said second shaft in a second direction, and the speed of said second shaft in a first direction is substantially equal to the speed of rotation of said first shaft in said first direction of rotation.

11. A transmission system as claimed in claim 3 wherein said power transfer means comprises in combination:
a first rotatable shaft connected to said hydraulic drive;
a second rotatable shaft connected to said second power input member;
said first shaft being adapted to drive in a first direction and be driven in a second direction;
said second shaft adapted to be driven in a first direction by said first shaft when said first shaft is rotating in said first direction and to drive said first shaft in said second direction when said second shaft is driving in a second direction; and coupling means for connecting said shafts whereby the speed of rotation of said first shaft in a second direction exceeds the speed of rotation of said second shaft in a second direction, and the speed of said second shaft in a first direction is substantially equal to the speed of rotation of said first shaft in said first direction of rotation.

12. A transmission system as claimed in claim 4 wherein said power transfer means comprises in combination:
a first rotatable shaft connected to said hydraulic drive;
a second rotatable shaft connected to said second power input member;
said first shaft being adapted to drive in a first direction and be driven in a second direction;
said first shaft being adapted to drive in a first direction and be driven in a second direction;
said second shaft adapted to be driven in a first direction by said first shaft when said first shaft is rotating in said first direction and to drive said first shaft in said second direction when said second shaft is driving in a second direction; and coupling means for connecting said shafts whereby the speed of rotation of said first shaft in a second direction exceeds the speed of rotation of said second shaft in a second direction, and the speed of said second shaft in a first direction is substantially equal to the speed of rotation of said first shaft in said first direction of rotation.

13. A transmission system as claimed in claim 1 wherein said power transfer means comprises in combination:
   a first shaft connected to said hydraulic drive;
   a second shaft connected to said second power input member;
   said first shaft being adapted to drive in a first direction and be driven in a second direction, said second shaft being adapted to be driven in a first direction and drive in a second direction;
   and coupling means for connecting said shafts whereby the speed of rotation of said first shaft in a second direction exceeds the speed of rotation of said second shaft in a second direction and the speed or rotation of said second shaft in a first direction exceeds the speed of rotation of said first shaft in a first direction of rotation.

14. A transmission system as claimed in claim 2 wherein said power transfer means comprises in combination:
   a first shaft connected to said hydraulic drive;
   a second shaft connected to said second power input member,
   said first shaft being adapted to drive in a first direction and be driven in a second direction, said second shaft being adapted to be driven in a first direction and drive in a second direction;
   and coupling means for connecting said shafts whereby the speed of rotation of said first shaft in a second direction exceeds the speed of rotation of said second shaft in a second direction and the speed or rotation of said second shaft in a first direction exceeds the speed of rotation of said first shaft in a first direction of rotation.

15. A transmission system as claimed in claim 3 wherein said power transfer means comprises in combination:
   a first shaft connected to said hydraulic drive;
   a second shaft connected to said second power input member;
   said first shaft being adapted to drive in a first direction and be driven in a second direction, said second shaft being adapted to be driven in a first direction and drive in a second direction;
   and coupling means for connecting said shafts whereby the speed of rotation of said first shaft in a second direction exceeds the speed of rotation of said second shaft in a second direction and the speed of rotation of said second shaft in a first direction exceeds the speed of rotation of said first shaft in a first direction of rotation.

16. A transmission system as claimed in claim 4 wherein said power transfer means comprises in combination:
   a first shaft connected to said hydraulic drive;
   a second shaft connected to said second power input member,
   said first shaft being adapted to drive in a first direction and be driven in a second direction, said second shaft being adapted to be driven in a first direction and drive in a second direction;
   and coupling means for connecting said shafts whereby the speed of rotation of said first shaft in a second direction exceeds the speed of rotation of said second shaft in a second direction and the speed of rotation of said second shaft in a first direction exceeds the speed of rotation of said first shaft in a first direction of rotation.

17. A transmission system comprising in combination:
   a source or rotary power; a variable speed reversible hydraulic drive and control means therefor; a differential gear assembly including a first power input member, a second power input member and a power output member, said first power input member being connectable to said source of rotary power for unidirectional rotation thereby, said second power input member being connectable to said source of rotary power through said hydraulic drive; and power transfer means for connecting said second power input member and hydraulic drive whereby in a first direction of rotation of said hydraulic drive the drive ratio between said second power input member and said hydraulic drive is of a first predetermined value, and in a second direction of rotation of said hydraulic drive assumes a second predetermined value; said power transfer means comprising in combination, a first shaft connected to said hydrauilc drive and a second shaft connected to said second power input member, said first shaft being adapted to drive in a first direction and be driven in a second direction, said second shaft being adapted to be driven in a first direction and to drive in a second direction; and coupling means comprising two individual connecting means each independently operable to connect said shafts, each of said connecting means providing a different drive ratio between said shafts whereby the speed of said first shaft in a second direction of rotation exceeds the speed of said second shaft in a second direction of rotation by an amount determined by the ratio of said first connecting means and the speed of said second shaft in a first direction of rotation is less than the speed of said first shaft in a first direction of rotation by an amount determined by the ratio of said second connecting means.

18. A transmission system as claimed in claim 17 including means for actuating said power transfer means in accordance with the direction of rotation of said hydraulic drive.

19. A transmission system comprising in combination:
   a source of rotary power; a variable speed reversible hydraulic drive and control means therefor; a differential gear assembly including a first power input member, a second power input member and a power output member, said first power input member being connectable to said source of rotary power for unidirectional rotation thereby, said second power input member being connectable to said source of rotary power through said hydraulic drive; and power transfer means for connecting said second power input member and said hydraulic drive whereby in a first direction of rotation of said hydraulic drive the drive ratio between said second power input member and said hydraulic drive is of a first predetermined value, and in a second direction of rotation of said hydraulic drive assumes a second predetermined value; said power transfer means comprising in combination a first shaft connected to said hydraulic drive and a second shaft connected to said second power input member, said first shaft being adapted to drive in a first direction and be driven in a second direction, said second shaft being adapted to be driven in a first direction and to drive in a second direction; and coupling means for connecting said shafts to provide mutually exclusive first and second transmission paths each having an individual drive ratio between said shafts whereby the speed of said first shaft in a second direction of rotation exceeds the speed of said second shaft in a second direction of rotation by an amount determined by the drive ratio of said second transmission path and said speed of said second shaft in a first direction of rotation is less than the speed of said first shaft in a first direction of rotation by an amount determined by the drive ratio of said first transmission path.

20. A transmission system as claimed in claim 19 including control means for actuating said power transfer means in accordance with the direction of rotation of said hydraulic drive.

21. A transmission system as claimed in claim 5 wherein said coupling means includes first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

22. A transmission system as claimed in claim 6 wherein said coupling means includes first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

23. A transmission system as claimed in claim 9 wherein said coupling means includes first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

24. A transmission system as claimed in claim 10 wherein said coupling means includes first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

25. A transmission system as claimed in claim 13 wherein said first and second shafts are adapted for connection by first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

26. A transmission system as claimed in claim 14 wherein said first and second shafts are adapted for connection by first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

27. A transmission system as claimed in claim 17 wherein said first and second shafts are adapted for connection by first and second independent clutch means, a pair of gears associated with at least one of said clutch means, said clutch means being responsive to the direction of rotation of at least one of said shafts whereby the drive ratio of said shafts in one direction of rotation differs from the drive ratio of said shafts in an opposite direction of rotation.

28. A transmission system as claimed in claim 7 wherein said coupling means includes first and second clutch means, a pair of gears associated with at least one of said clutch means; said means for actuating said power transfer means including sensing means for determining the direction of rotation of at least one of said shafts and operating means for actuating said clutch means in accordance with the determination of said sensing means.

29. A transmission system as claimed in claim 8 wherein said coupling means includes first and second independent clutch means, a pair of gears associated with at least one of said clutch means, said control means including sensing means for determining the direction of rotation of at least one of said shafts and operating means for actuating said clutch means in accordance with the determination of said sensing means.

30. A transmission system as claimed in claim 11 wherein said coupling means includes first and second independent clutch means, a pair of gears associated with at least one of said clutch means, said control means including sensing means for determining the direction of rotation of at least one of said shafts and operating means for actuating said clutch means in accordance with the determination of said sensing means.

31. A transmission system as claimed in claim 12 wherein said coupling means includes first and second independent clutch means, a pair of gears associated with at least one of said clutch means, said control means including sensing means for determining the direction of rotation of at least one of said shafts and operating means for actuating said clutch means in accordance with the determination of said sensing means.

32. A transmission system as claimed in claim 15 wherein said first and second shafts are adapted for connection by first and second independent clutch means, a pair of gears associated with at least one of said clutch means, said control means including sensing means for determining the direction of rotation of at least one of said shafts and operating means for actuating said clutch means in accordance with the determination of said sensing means.

33. A transmission system as claimed in claim 16 wherein said first and second shafts are adapted for connection by first and second independent clutch means, a pair of gears associated with at least one of said clutch means, said control means including sensing means for determining the direction of rotation of at least one of said shafts and operating means for actuating said clutch means in accordance with the determination of said sensing means.

34. A transmission system as claimed in claim 18 wherein said first and second shafts are adapted for connection by first and second independent clutch means, a pair of gears associated with at least one of said clutch means, said control means including sensing means for determining the direction of rotation of at least one of said shafts and operating means for actuating said clutch means in accordance with the determination of said sensing means.

35. A transmission system as claimed in claim 23 wherein said first and second clutch means are oppositely actuated one-way clutches.

36. A transmission system as claimed in claim 22 wherein said first and second clutch means are oppositely actuated one-way clutches.

37. A transmission system as claimed in claim 23 wherein said first and second clutch means are oppositely actuated one-way clutches.

38. A transmission system as claimed in claim 24 wherein said first and second clutch means are oppositely actuated one-way clutches.

39. A transmission system as claimed in claim 1 wherein at a predetermined speed differential between said first power input member and said second power input member said power output member is in a free-wheeling attitude.

40. A transmission system as claimed in claim 2 wherein at a predetermined speed differential between said first power input member and said second power input member said power output member is in a free-wheeling attitude.

41. A transmission system as claimed in claim 35 wherein at a predetermined speed differential between said first power input member and said second power input member said power output member is in a free-wheeling attitude.

42. A transmission system as claimed in claim 36 wherein at a predetermined speed differential between said first power input member and said second power input member said power output member is in a freewheeling attitude.

43. A transmission system as claimed in claim 1 in which said first power input member comprises a sun gear, said second power input member comprises a ring gear and said power output member comprises a planetary gear carrier.

44. A transmission system as claimed in claim 2 in which said first power input member comprises a sun gear, said second power input member comprises a ring gear and said power output member comprises a planetary gear carrier.

45. A transmission system as claimed in claim 1 including:
a final drive;
a forward gear;
a reverse gear;
and clutch means for selectively connecting said power output member, said final drive and one of said gears to control the direction of said final drive.

46. A transmission system as claimed in claim 2 including:
a final drive;
a forward gear;
a reverse gear;
and clutch means for selectively connecting said power output member, said final drive and one of said gears to control the direction of said final drive.

47. A transmission system as claimed in claim 43 including:
a final drive;
a forward gear;
a reverse gear;
and clutch means for selectively connecting said power output member, said final drive and one of said gears to control the direction of said final drive.

48. A transmission system as claimed in claim 44 including:
a final drive;
a forward gear;
a reverse gear;
and clutch means for selectively connecting said power output member, said final drive and one of said gears to control the direction of said final drive.

49. A transmission system as claimed in claim 1 wherein said power transfer means includes power transfer control means for actuation of said power transfer means in response to the direction of rotation of said hydraulic drive.

50. A transmission system as claimed in claim 2 wherein said power transfer means includes power transfer control means for actuation of said power transfer means in response to the direction of rotation of said hydraulic drive.

51. A transmission system as claimed in claim 5 including control means for actuation of said coupling means in response to the direction of rotation of at least one of said shafts.

52. A transmission system as claimed in claim 6 including control means for actuation of said coupling means in response to the direction of rotation of at least one of said shafts.

53. A transmission system as claimed in claim 49 wherein said power transfer means comprises a pair of oppositely actuable clutch means, and said power transfer control means includes sensing means for determining the direction of rotation of said hydraulic drive, and operating means for actuating said clutch means in accordance with the determination of said sensing means.

54. A transmission system as claimed in claim 50 wherein said power transfer means comprises a pair of oppositely actuable clutch means; and said power transfer control means includes sensing means for determining the direction of rotation of said hydraulic drive and clutch operating means for actuating said clutch means in accordance with the determination of said sensing means.

55. A transmission system as claimed in claim 28 wherein said first and second clutch means are oppositely actuated one-way clutches.

56. A transmission system as claimed in claim 29 wherein said first and second clutch means are oppositely actuated one-way clutches.

57. A transmission system as claimed in claim 30 wherein said first and second clutch means are oppositely actuated one-way clutches.

58. A transmission system as claimed in claim 31 wherein said first and second clutch means are oppositely actuated one-way clutches.

59. A transmission system as claimed in claim 3 in which said first power input member comprises a sun gear, said second power input member comprises a ring gear and said power output member comprises a planetary gear carrier.

60. A transmission system as claimed in claim 4 in which said first power input member comprises a sun gear, said second power input member comprises a ring gear and said power output member comprises a planetary gear carrier.

61. A transmission system as claimed in claim 3 including:
a final drive;
a forward gear;
a reverse gear;
and clutch means for selectively connecting said power output member, said final drive and one of said gears to control the direction of said final drive.

62. A transmission system as claimed in claim 4 including:
a final drive;
a forward gear;
a reverse gear;
and clutch means for selectively connecting said power output member, said final drive and one of said gears to control the direction of said final drive.

63. A transmission system as claimed in claim 59 including:
a final drive;
a forward gear;
a reverse gear;
and clutch means for selectively connecting said power output member, said final drive and one of said gears to control the direction of said final drive.

64. A transmission system as claimed in claim 60 including:
a final drive;
a forward gear;
a reverse gear;
and clutch means for selectively connecting said power output member, said final drive and one of said gears to control the direction of said final drive.

65. A transmission system as claimed in claim 3 wherein said means for actuating said power transfer means is responsive to actuation of said hydraulic drive control means.

66. A transmission system as claimed in claim 4 wherein said means for actuating said power transfer means is responsive to actuation of said hydraulic drive control means.

67. A transmission system as claimed in claim 7 wherein said means for actuating said power transfer means is responsive to actuation of said hydraulic drive control means.

68. A transmission system as claimed in claim 8 wherein said means for actuating said power transfer means is responsive to actuation of said hydraulic drive control means.

69. A transmission system as claimed in claim 11 wherin said means for actuating said power transfer means is responsive to actuation of said hydraulic drive control means.

70. A transmission system as claimed in claim 12 wherein said means for actuating said power transfer means is responsive to actuation of said hydraulic drive control means.

71. A transmission system as claimed in claim 15 wherein said means for actuating said power transfer means is responsive to actuation of said hydraulic drive control means.

72. A transmission system as claimed in claim 16 wherein said means for actuating said power transfer means is responsive to actuation of said hydraulic drive control means.

References Cited by the Examiner

UNITED STATES PATENTS

| | | | |
|---|---|---|---|
| 2,808,737 | 10/1957 | Bullard | 74—687 |
| 2,939,342 | 6/1960 | Woydt | 74—687 |
| 3,055,233 | 9/1962 | Giles | 74—688 |

FOREIGN PATENTS 1,150,884   6/1963   Germany.

LAURENCE V. EFNER, *Primary Examiner.*